(12) United States Patent
Negron et al.

(10) Patent No.: US 8,770,913 B1
(45) Date of Patent: Jul. 8, 2014

(54) APPARATUS AND PROCESS FOR ROTOR CREEP MONITORING

(75) Inventors: Antonio Negron, Boqueron, PR (US); Joseph D Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 800 days.

(21) Appl. No.: 12/817,440

(22) Filed: Jun. 17, 2010

(51) Int. Cl.
*F04D 27/02* (2006.01)

(52) U.S. Cl.
USPC ................................. 415/1; 415/14; 415/118

(58) Field of Classification Search
USPC ............ 415/1, 14, 118; 416/1, 35, 38, 51, 52, 416/61, 66
See application file for complete search history.

(56) References Cited

U.S. PATENT DOCUMENTS

| 5,739,524 A * | 4/1998 | Fally | 250/227.11 |
| 2007/0154305 A1* | 7/2007 | Arness et al. | 415/209.2 |
| 2010/0257838 A1* | 10/2010 | Mazzaro et al. | 60/39.091 |

* cited by examiner

*Primary Examiner* — Edward Look
*Assistant Examiner* — Juan G Flores
(74) *Attorney, Agent, or Firm* — John Ryznic

(57) ABSTRACT

An apparatus and a process for measuring rotor creep values for a monolithic rotor of an industrial gas turbine engine in order to determine when creep growth of the rotor has exceeded an allowable limit. One or more critical locations of the rotor are measured for real-time radius, and a CPU having rotor creep deflection model is used to compare the real-time data and determine if the rotor creep is within safe and allowable limits. If the creep is determined to exceed allowable values, then an alarm in initiated or engine shutdown occurs.

8 Claims, 2 Drawing Sheets

APPARATUS AND PROCESS FOR ROTOR CREEP MONITORING

GOVERNMENT LICENSE RIGHTS

None.

CROSS-REFERENCE TO RELATED APPLICATIONS

None.

BACKGROUND OF THE INVENTION

1. Field of the Invention

The present invention relates generally to gas turbine engine, and more specifically for an apparatus and process for measuring creep of a rotor shaft of an industrial gas turbine engine.

2. Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by increasing the compression ratio. Increases in compression ratio in modern IGT engines cause an increase in the compressor exhaust temperatures, which for some engines can translate into increased creep deformation of the rotor at the later compressor stages.

Some of the current state of the art IGT engines have a monolithic rotor shaft instead of a number of smaller rotor disks bolted together to form the entire rotor for the engine. A monolithic rotor shaft is one single piece rotor shaft for the entire engine. One major problem with an engine having a monolithic rotor is with creep. Creep occurs due to high centrifugal forces from rotation and is exacerbated by high temperatures. In the case of a rotor, creep deformation will cause permanent radial growths that tend to force the material to grow outward. If the rotor suffers from excessive creep, cracks will develop that can eventually result in the catastrophic damage to the rotor and therefore to the engine. An OEM of these monolithic rotor engines will typically issue a conservative maximum time allowance for safe usage for the rotor in which the older rotor must be replaced before and creep damage becomes significant. Currently there is no commercially available way of measuring the remaining creep capability of a rotor. This in combination with the fact that safe operation rotor life estimates tend to be developed for worse case conditions, and in a very conservative manners, results in situations where an older rotor that would still have remaining safe service life would potentially be replaced, at a substantial cost to the IGT engine user.

BRIEF SUMMARY OF THE INVENTION

An apparatus and a process for measuring rotor creep in an industrial gas turbine engine in which the rotor is a single piece or monolithic rotor. A real-time optical measurement device is used to measure the running radius of the rotor at a critical location as a function of time. A computer will then compare the optical measurement radius values against expected values for the location in consideration, and would calculate the running deflection of the rotor for that region. If the running deflection values are larger than normally accepted values for the region of interest, then the computer will use internally stored and previously validated creep deflection models to determine the creep deformation and deformation rate regime. If the creep deformation growth rate exceeds previously determined safe operation parameters, then the computer would issue an alarm and alert the IGT engine user of a potential creep deformation issue.

DETAILED DESCRIPTION OF THE INVENTION

Figure 1:
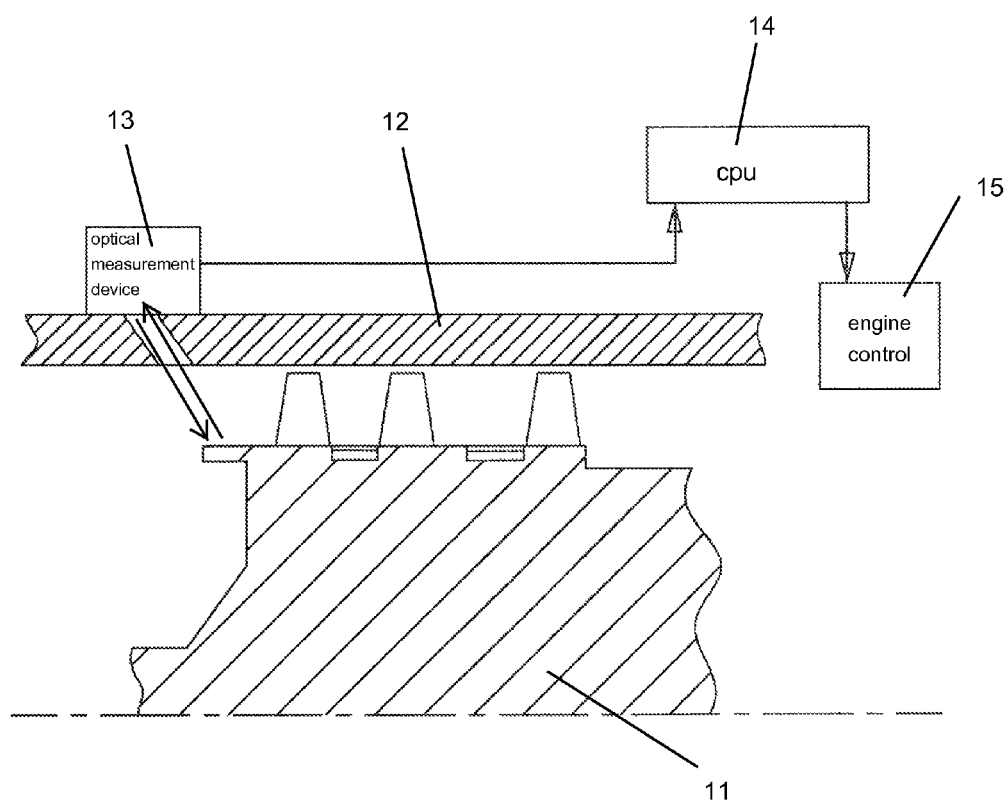
FIG. 1 shows a cross section view of the rotor creep monitoring device of the present invention.

An apparatus for rotor creep monitoring of an industrial gas turbine engine is shown in FIG. 1 and includes a monolithic rotor 11 with a number of rotor blades extending from the outer surface, an engine case 12, a real-time optical measurement device 13 that can measure a deflection of the rotor at one or more critical locations, a computer or CPU 14 that processes the data from the optical measurement device 13, and an engine controller 15 that receives signals from the CPU to control the operation of the engine or signal a user about a condition of the engine.

The real-time optical measurement device 13 can send a signal to a critical surface of the rotor 11 and measure a radius of the rotor at that location on a real-time basis. The apparatus will measure continuously or at desired intervals a number of measurements representing the rotor radius and will compared the measured data with acceptable and historical unit specific data to determine how much creep deformation has occurred. The apparatus can measure one or more critical locations in order to generate enough data to adequately evaluate the creep that occurs for the entire rotor 11. An optical window can be used on the engine case 12 in order for a signal to be sent and then received by the optical measurement device. The CPU will receive the measurements from the optical measurement device 13 and process the data to determine the rotor radius at the different intervals and any creep growth.

Creep is also a function of the material properties of the rotor. The CPU will also be given the material properties of the rotor so that the creep growth versus operational time can be determined, along with other properties necessary in order to determine when the rotor is about to exceed allowable creep and thus a safe operating life. The computer can be programmed to alert an operator or to shut down the engine before any catastrophic damage from creep can occur.

Figure 2:
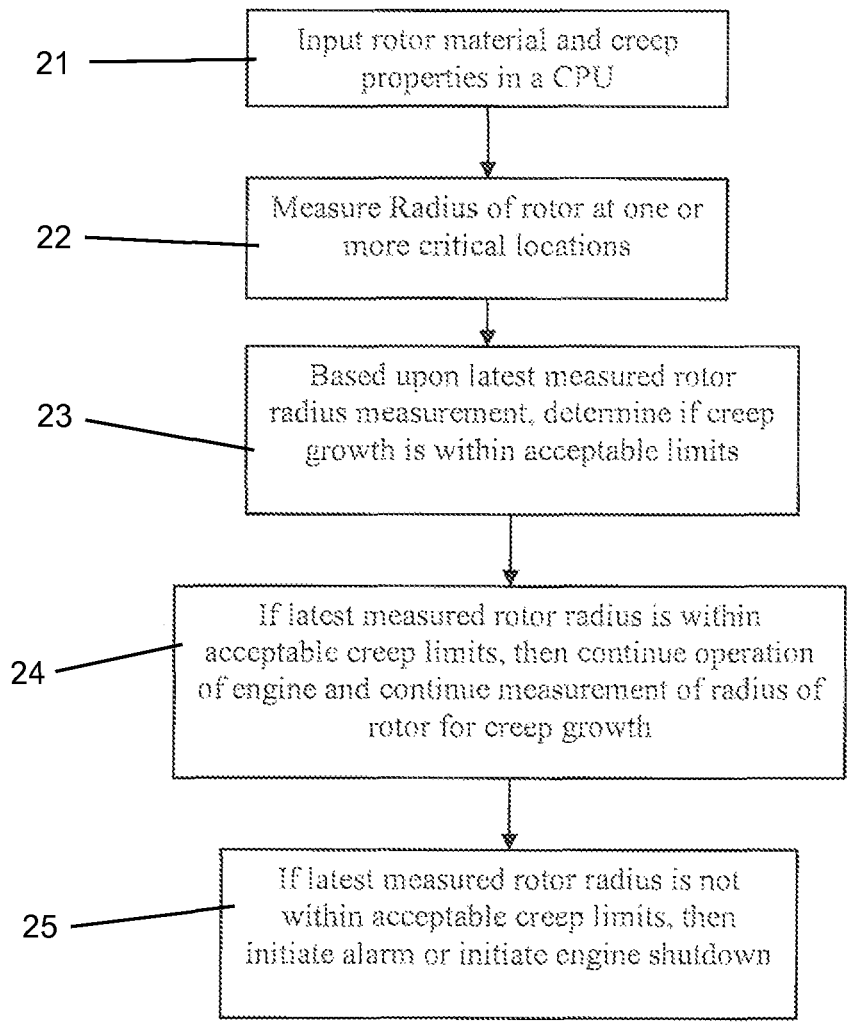
FIG. 2 shows a flow chart for the process of rotor creep monitoring of the present invention.

FIG. 2 shows a flow chart of the process for rotor creep monitoring of the present invention. With the engine in operation, the CPU is input with material characteristic and other data necessary to determine when creep growth of the rotor is unsafe (step 21). An optical measurement device measures a radius of a critical location of the rotor (step 22). The CPU receives the radii measurements and processes the data on a real-time basis while calculating when a critical amount of creep is about to occur (step 23). When the CPU determines that a critical creep growth is about to occur, the CPU will signal an operator of such critical period or shut down the engine (step 25). If the rotor is within the allowable creep limits, then engine operation continues and the process of measuring the radius for creep growth continues (step 24).

The real-time rotor radius measurements are compared against validated creep deflection models that have been established for the particular rotor having the specific material characteristics and properties such that allowable creep levels can be known.

We claim:

1. A process for measuring rotor creep of an industrial gas turbine engine, the engine having a monolithic rotor, the process comprising the steps of:
   determine the rotor creep properties;
   measure a radius of the rotor at a critical location;
   based upon the rotor creep properties and the measured radius of the rotor, determine if a creep value of the rotor is within an acceptable limit;
   if the creep value is within an acceptable limit, then continue to operate the engine and measure a radius of the rotor at the critical location; and,
   if the creep value is not within an acceptable limit, then initiate an alarm or initiate engine shutdown.

2. The process for measuring rotor creep of claim 1, and further comprising the step of:
   the step of measuring a radius of the rotor at a critical location includes measuring the radius as a function of time the rotor diameter at the critical location.

3. The process for measuring rotor creep of claim 2, and further comprising the step of:
   the step of measuring the radius of the rotor at a critical location includes measuring the rotor with a real-time optical measurement device.

4. The process for measuring rotor creep of claim 2, and further comprising the step of:
   the step of determining if a creep value of the rotor is within an acceptable limit includes comparing measured radius values as a function of time with a validated creep deflection model.

5. The process for measuring rotor creep of claim 2, and further comprising the step of:
   measuring a radius of the rotor at a critical location includes measuring a radius of the rotor at a plurality of critical locations.

6. An industrial gas turbine engine comprising:
   a monolithic rotor with a compressor and a turbine rotatably connected to the rotor;
   a real-time rotor diameter measuring device secured to a casing of the engine so that a radius of a critical location of the rotor can be measured;
   a CPU having a creep deflection model for the rotor;
   the CPU being operatively connected to the real-time rotor diameter measuring device to collect the real-time measurements of the rotor radius at the critical location; and,
   the CPU initiating an alarm or an engine shutdown when the rotor creep is determined to exceed an allowable limit.

7. The industrial gas turbine engine of claim 6, and further comprising:
   the CPU records the rotor radius measurements as a function of time.

8. The industrial gas turbine engine of claim 7, and further comprising:
   a plurality of real-time rotor diameter measuring devices positioned around the rotor to measure a plurality of critical locations on the rotor.

\* \* \* \* \*